(12) United States Patent
Bretagnol et al.

(10) Patent No.: US 10,843,668 B2
(45) Date of Patent: Nov. 24, 2020

(54) DEVICE FOR PROTECTING AN OPTICAL SENSOR, AND ASSOCIATED DRIVER ASSISTANCE SYSTEM AND CLEANING METHOD

(71) Applicant: Valeo Systèmes d'Essuyage, Le Mesnil Saint Denis (FR)

(72) Inventors: Frédéric Bretagnol, Issoire (FR); Giuseppe Grasso, Issoire (FR); Grégory Kolanowski, Issoire (FR); Marcel Trebouet, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 16/461,907

(22) PCT Filed: Nov. 17, 2017

(86) PCT No.: PCT/EP2017/079565
§ 371 (c)(1),
(2) Date: May 17, 2019

(87) PCT Pub. No.: WO2018/091641
PCT Pub. Date: May 24, 2018

(65) Prior Publication Data
US 2019/0329737 A1 Oct. 31, 2019

(30) Foreign Application Priority Data

Nov. 17, 2016 (FR) .................................... 16 61121

(51) Int. Cl.
*B60S 1/66* (2006.01)
*B08B 17/02* (2006.01)
(Continued)

(52) U.S. Cl.
CPC ................ *B60S 1/56* (2013.01); *B08B 17/02* (2013.01); *B60R 11/04* (2013.01); *G02B 5/208* (2013.01); *G03B 17/08* (2013.01)

(58) Field of Classification Search
None
See application file for complete search history.

(56) References Cited

U.S. PATENT DOCUMENTS 5,604,551 A * 2/1997 Choi .................... H04N 5/2252
348/E5.026
5,822,638 A * 10/1998 Yoshida ................. G03B 15/05
396/448
(Continued)

FOREIGN PATENT DOCUMENTS

KR 2007 0034729 A 3/2007

OTHER PUBLICATIONS

International Search Report and Written Opinion in corresponding International Application No. PCT/EP2017/079565, dated Feb. 28, 2018 (18 pages).

*Primary Examiner* — Reza Aghevli
(74) *Attorney, Agent, or Firm* — Osha Bergman Watanabe & Burton LLP (57) ABSTRACT

The invention concerns a protection device (3) for protecting an optical sensor (13) for a motor vehicle. According to the invention, the protection device (3) comprises: —a transparent optical element (9) mounted rotatably movable about an axis of rotation (A1), configured to be arranged upstream from an optical unit (14) of the optical sensor (13) such that the axis of rotation (A1) of same coincides with the optical axis (15), and —a motor (5) comprising a rotary shaft (51) configured to rotate about an axis of rotation (A2), and configured to rotate said optical element (9) such that the axis of rotation (A1) of said optical element (9) further coincides with the axis of rotation (A2) of the rotary shaft (Continued)

(51) of the motor (5). The invention also concerns a corresponding driver assistance system (1) and a cleaning method implementing such a protection device (3).

15 Claims, 3 Drawing Sheets

(51) Int. Cl.
*B60R 11/04* (2006.01)
*G03B 17/08* (2006.01)
*B60S 1/56* (2006.01)
*G02B 5/20* (2006.01)

(56) References Cited

U.S. PATENT DOCUMENTS

| | | | | |
|---|---|---|---|---|
| 5,886,738 | A * | 3/1999 | Hollenbeck | G08B 13/19619 340/936 |
| 8,000,598 | B1 * | 8/2011 | Tsai | G03B 11/045 396/534 |
| 8,118,501 | B2 * | 2/2012 | Buschmann | G03B 11/00 396/448 |
| 8,305,439 | B2 * | 11/2012 | Cheng | H04N 7/185 348/143 |
| 10,389,188 | B2 * | 8/2019 | Darras | H02K 3/28 |
| 10,505,409 | B2 * | 12/2019 | Darras | H02K 1/16 |
| 10,523,095 | B2 * | 12/2019 | Darras | H02K 15/026 |
| 10,533,876 | B2 * | 1/2020 | Ghannam | B60S 1/62 |
| 2005/0094027 | A1 * | 5/2005 | Kano | G03B 11/06 348/362 |
| 2010/0209096 | A1 * | 8/2010 | Buschmann | G03B 11/00 396/448 |
| 2011/0002683 | A1 * | 1/2011 | Li | G03B 17/04 396/341 |
| 2011/0181725 | A1 * | 7/2011 | Matsuura | G03B 17/02 348/148 |
| 2012/0195579 | A1 * | 8/2012 | Ho | G03B 17/12 396/74 |
| 2013/0163977 | A1 * | 6/2013 | Mack | G03B 17/02 396/428 |
| 2017/0040858 | A1 * | 2/2017 | Darras | H02K 15/066 |
| 2017/0297540 | A1 * | 10/2017 | Zhang | B60S 1/566 |
| 2017/0313288 | A1 * | 11/2017 | Tippy | B60R 11/04 |
| 2019/0041234 | A1 * | 2/2019 | Ghannam | B60S 1/56 |

* cited by examiner

DEVICE FOR PROTECTING AN OPTICAL SENSOR, AND ASSOCIATED DRIVER ASSISTANCE SYSTEM AND CLEANING METHOD

The present invention relates to the field of driver assistance and in particular to driver assistance systems, installed on certain motor vehicles, the driver assistance system able to include an optical sensor, like for example a camera comprising a lens. More particularly, the invention relates to a device for protecting such an optical sensor. The invention also relates to a method for cleaning an optical element of such a protection device.

At present, forward, backward or side looking cameras equip a large number of motor vehicles. They are in particular part of driver assistance systems, such as parking assistance systems, or lane departure detection systems.

Cameras are known that are installed inside the passenger compartment of a vehicle against the rear window/screen looking backwards from the rear window of the vehicle. These cameras are well protected from outside climatic variations and contamination caused by organic or mineral pollutants. However, the viewing angle for such cameras, installed inside the passenger compartment, is not optimum, in particular for parking assistance, as they do not allow obstacles close to the rear of the vehicle for example to be seen.

For this reason, it is therefore preferable to install driver assistance systems outside the vehicles, at different places depending on the desired use, for example at the rear or front fenders, or at the front or rear license plate of the vehicle. In this case, the camera is therefore highly exposed to the projections of mineral or organic contaminants that can be deposited on its optical unit and thus reduce its efficiency, even make it inoperable. In particular in rainy weather, projections of rain and contaminants are seen that can significantly affect the operability of the driver assistance system comprising such a camera. The surfaces of the optical units of cameras must be cleaned so as to guarantee that they function correctly.

In order to counteract the depositing of contaminants on the camera, arranging a device for cleaning the camera optical unit is known, generally an atomizer of cleaning fluid, close to same, so as to eliminate the polluting elements that have been deposited over time. However, the use of these atomizers brings an increase in the operating costs of such driver assistance systems as they necessitate the use of quite large quantities of cleaning liquid. Furthermore, the camera optical unit, which is a relatively fragile element, is not protected from projections that could damage it.

It is also known to mount the camera inside the outside paneling of the vehicle, and to protect said camera from outside attacks by means of a protection pane or window fastened to the paneling and arranged facing the lens. Although the camera may be protected from outside attacks, the protection pane or window remains exposed to the depositing of pollutants.

According to a known solution, means of vibrating the protection pane facing the camera are provided so as to detach the contaminants from the camera protection pane. However, it has been found that the effectiveness of such a device for stubborn and incrusted contaminants can be limited in spite of the vibration of the protection pane.

According to another solution, the protection device comprises a casing, in which the camera is arranged, and a rotating cover closing this casing and whose axis of rotation is off-center with respect to the optical axis of the camera. The protection device also comprises a screen wiper arm.

However, such a protection device can be noisy if the cover is rotated at high speeds, in particular because of friction between the cover and the screen wiper arm. Furthermore, the screen wiper arm can display premature wear due to the continuous rotation at relatively high speed of the cover. Also, such a protection device can be quite sizable to install, as the rotating cover is off-center with respect to the optical sensor and has a diameter at least twice the diameter of the optical unit of the optical sensor that it protects and whose correct operation it ensures. Subsequently, it is possible for micro scores to appear on the cover if solid particles are deposited between the screen wiper arm and the rotating cover. The field of view and the quality of the images taken by the optical sensor can be affected as a result. Finally, the use of such a protection system does not allow a wide viewing angle, due to the arrangement of the optical sensor inside the casing supporting the cover, without making this casing a protrusion.

The present invention proposes to remedy at least partially the abovementioned disadvantages by presenting an alternative device for protecting an optical sensor making it possible to prevent the depositing of contaminants on the optical sensor such as a camera, while preserving a wide viewing angle.

To do this, the object of the invention is a device for protecting an optical sensor for a motor vehicle.

According to the invention, the protection device includes:
- a transparent optical element mounted rotably movable about an axis of rotation, said optical element being configured to be arranged upstream from an optical unit of the optical sensor such that the axis of rotation of said optical element coincides with the optical axis of the optical sensor, and
- a motor comprising a rotary shaft configured to rotate about an axis of rotation, the motor being configured to rotate said optical element such that the axis of rotation of said optical element further coincides with the axis of rotation of the rotary shaft of the motor.

Such a protection device can be installed on an optical sensor intended to be installed inside a bodywork element of the vehicle, or outside the vehicle, while allowing the optical sensor to retain a wide viewing angle.

When it is raining or in dry weather, contaminants can be deposited on the optical element. "Contaminants" means both drops of water and organic or mineral pollutants. When the casing and the optical element are rotated by the motor, potential contaminants are ejected by centrifuge effect. In effect, the work of the centrifugal force caused in this way is greater than the adhesion force of the contaminants on the optical element. The rotation of the optical element therefore allows this optical element to be cleaned by centrifuge effect.

The optical sensor thus retains good operability and its contamination is limited whatever the climatic conditions.

Said device for protecting the optical sensor can furthermore include one or more of the following characteristics, taken separately or combined:
- the motor is hollow and is configured to accommodate the optical sensor at least partially;
- the motor is configured to accommodate more particularly in its hollow part a rear part of the optical sensor; rear part of the optical sensor means a part disposed opposite the optical element; in particular the optical sensor can include a main body, which houses the optical and electronic components able to perform the appropriate optical function, and a connection part arranged in the axial extension of the main body so as to house means for connecting these components, and the motor is configured to accommodate the connection part in its hollow part; it is thus possible to provide a motor of standard size able to cooperate with optical sensors, the shape and dimension of the main body of which vary from one device to the other;

said optical element is arranged at the front of the protection device so as to face a road scene, of which the optical sensor is configured to participate in taking images;

the motor is arranged on the side opposite said optical element;

said optical element is disposed in a centered way with respect to its axis of rotation;

said optical element is formed by a part of the optical sensor;

said optical element is distinct from the optical sensor;

the protection device includes a casing having a housing configured to accommodate the optical sensor;

the casing is integral with the rotary shaft of the motor;

the housing is defined by a wall of the casing;

the casing includes at least one through orifice;

the protection device comprises a fastening plate and a bearing of substantially annular general shape disposed between said optical element and the fastening plate;

said optical element has an inner surface having an antimist property, in particular the inner surface of said optical element has an antimist coating;

said optical element has at least one through orifice;

said optical element has an outer surface having at least one property chosen from the following list: infrared filter, photocatalytic, hydrophobic, super hydrophobic, lipophobic, hydrophilic, super hydrophilic, resistant to gravel.

The invention also relates to a driver assistance system comprising an optical sensor and a system for protecting the optical sensor such as described previously.

According to an aspect of the invention, the driver assistance system furthermore comprises:

a detection means such as a capacitive sensor configured to detect the approach of an object close to said optical sensor, and a means for inhibiting the rotation of said optical element for detecting the approach of an object close to said optical element.

The invention further relates to a method for cleaning an optical element of a device for protecting an optical sensor such as described previously, said method comprising at least one step of rotating said optical element for cleaning said optical element by centrifuge effect.

According to an aspect of the invention, said method includes at least two cleaning steps with a different speed of rotation of said optical element for each step.

Other characteristics and advantages of the invention will emerge more clearly on reading the following description, given as an illustrative and non-limitative example, and the attached drawings, among which.

On these figures, the identical elements bear the same reference numbers.

The following embodiments are examples. Although the description refers to one or more embodiments, this does not necessarily mean that each reference number relates to the same embodiment, or that the characteristics only apply to a single embodiment. Simple characteristics of different embodiments can also be combined or interchanged so as to provide other embodiments.

In the description, certain elements can be indexed, like for example first element or second element. In this case, this is simple indexing for differentiating and denominating close but not identical elements. This indexation does not imply a priority of an element with respect to another and such denominations can easily be interchanged without departing from the framework of the present description. Neither does this indexation imply an order in time.

Figure 1:
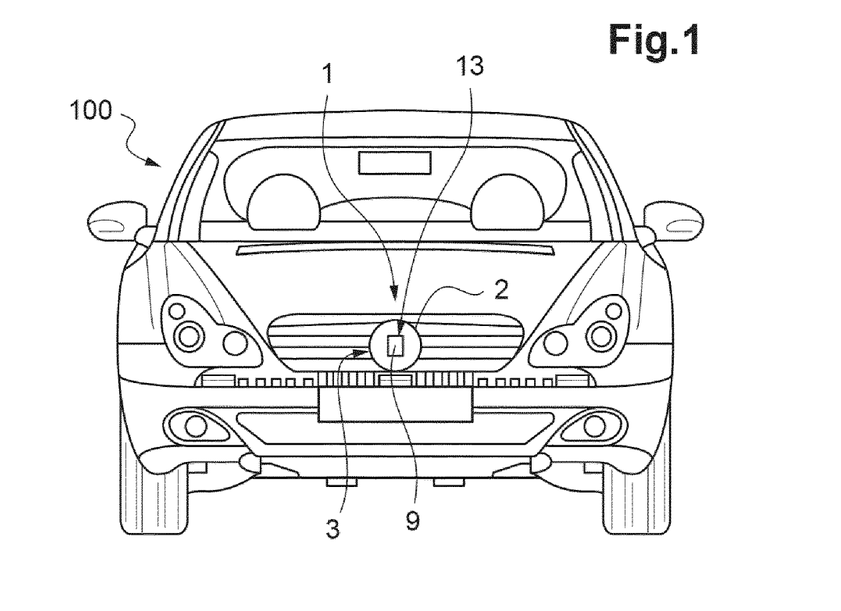
FIG. 1 schematically shows a motor vehicle comprising a driver assistance system according to the invention.

FIG. 1 shows a motor vehicle 100 equipped with at least one driver assistance system 1 according to the invention.

The driver assistance system 1 comprises in particular at least one optical sensor 13 and a device 3 for protecting the optical sensor 13.

The optical sensor 13 is for example an optical sensor 13 for taking images such as a camera. It can be a CCD (charged coupled device) sensor, namely a device for charge transferring or a CMOS sensor including a matrix of miniature photodiodes. According to another variant, it can be a sensor for laser remote detection called LIDAR sensor (light detection and ranging).

Figure 2A:
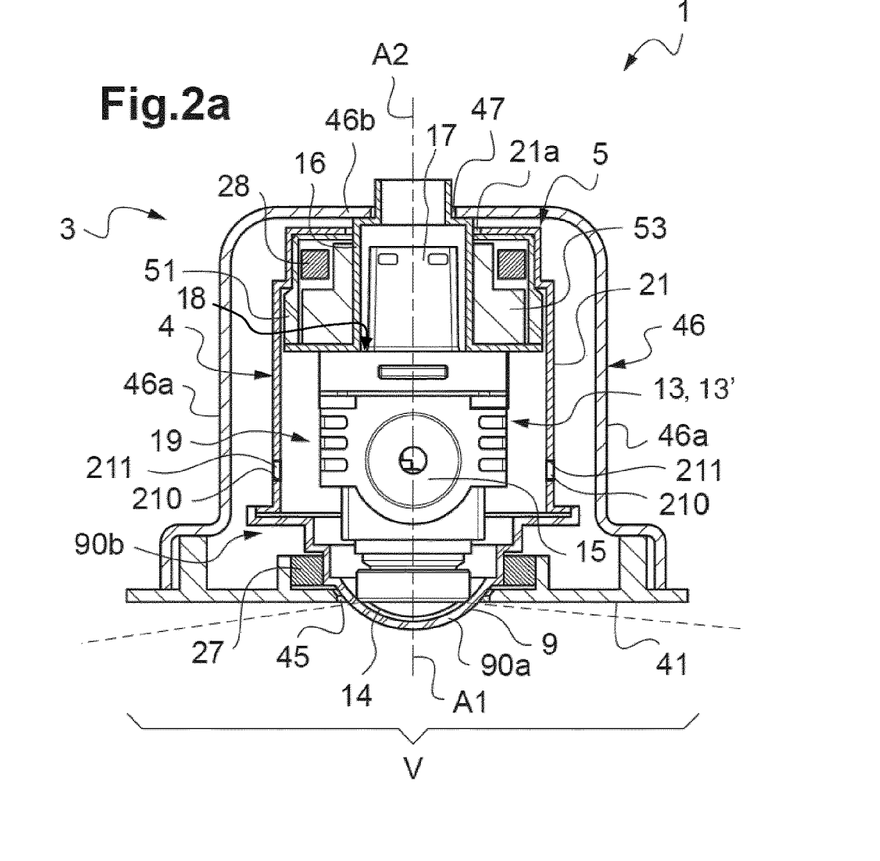
FIG. 2a is a partial longitudinal sectional view of a device for protecting an optical sensor of the assistance system of FIG. 1.
Figure 2B:
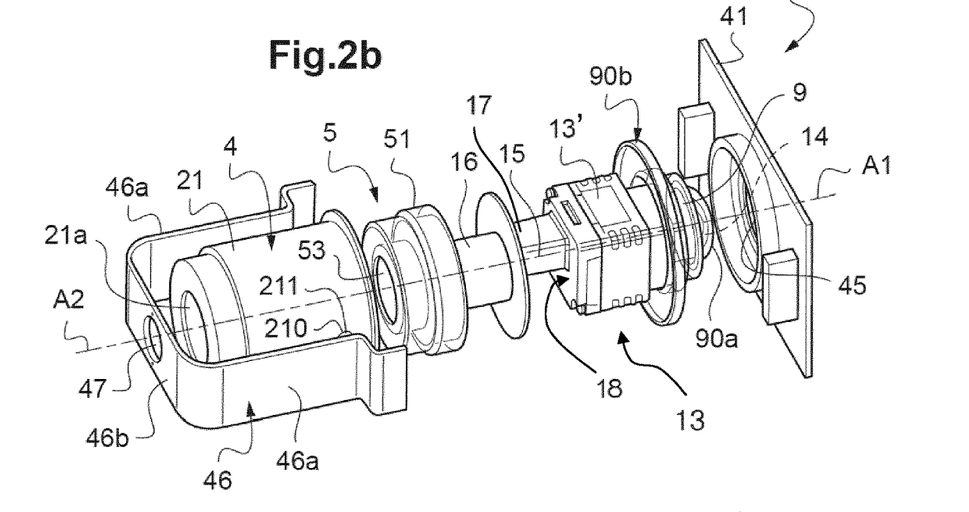
FIG. 2b is an exploded view of the device for protecting an optical sensor of FIG. 2a, FIG. 3 is a front and perspective view of the device for protecting the optical sensor of FIG. 2a, FIG. 4 is a back and perspective view of the device for protecting the optical sensor of FIG. 2a, FIG. 5 is a sectional view of an optical element of the protection device.

As can be seen better on FIGS. 2a, 2b, the optical sensor 13 includes an optical unit 14 with optical axis 15. The optical unit 14 is for example a lens. This optical unit 14 is for example convex (domed), of convexity oriented towards the outside of the optical sensor 13, like an optical unit called fish-eye.

The optical sensor 13 includes a main body 13', which accommodates the optical and electronic components able to perform the appropriate optical function, and a connection part 17 arranged in the axial extension of the main body so as to house the means for connecting these components, the connection part extending this main body rearwards, that is to say opposite the optical unit 14.

Opposite the optical unit, the main body 13' has an end surface 18 that extends perpendicular to the optical axis 15, and the connection part extends protruding from same. The end surface 18 thus forms a support surface around the connection part.

It should be noted that in the context of the invention, the connection part 17 can be of standard size whatever the shape and dimensions of the main body 13' of the optical sensor.

Furthermore, according to the particular illustrated example, the optical sensor 13 can comprise a linking piece 16, for example substantially cylindrical in shape, disposed around the back end of the optical sensor 13, in other words on the side opposite the optical unit 14, and more particularly around the connection part 17 arranged in the axial extension of the main body 13'. This linking piece 16 forms a passage for cables (not illustrated) necessary for the operation of the optical sensor 13, for example allowing the optical sensor 13 to be connected to an electric power supply source of the optical sensor 13 and/or allowing images captured by the optical sensor 13 to be transmitted to at least one image processing means (not illustrated) of the vehicle 100 (FIG. 1). As illustrated on the figures, this linking piece 16 has a sheath for passing cables, inside which the connection part 17 extends in particular, and a collar susceptible of bearing against the end surface 18 of the main body 13' of the optical sensor.

According to the illustrated embodiments, the optical sensor 13 is mounted in the protection device 3.

According to the example illustrated on FIG. 1, the protection device 3 is mounted at the front of the vehicle 100 at a fender. Of course, as a variant, the protection device 3 can be mounted at the rear of the vehicle 100, for example at the fender or the license plate. It can also be installed for example on the sides of the vehicle, at the rearview mirrors.

The protection device 3 can be fastened according to any known technique, to any element 2 of the vehicle 100, such as a bodywork element or an outside element like a fender, a rearview mirror or a license plate. To do this, it is possible to mention in a non-exhaustive way, a system of clips, a screwing system or a bonding system.

Figures 3, 4:
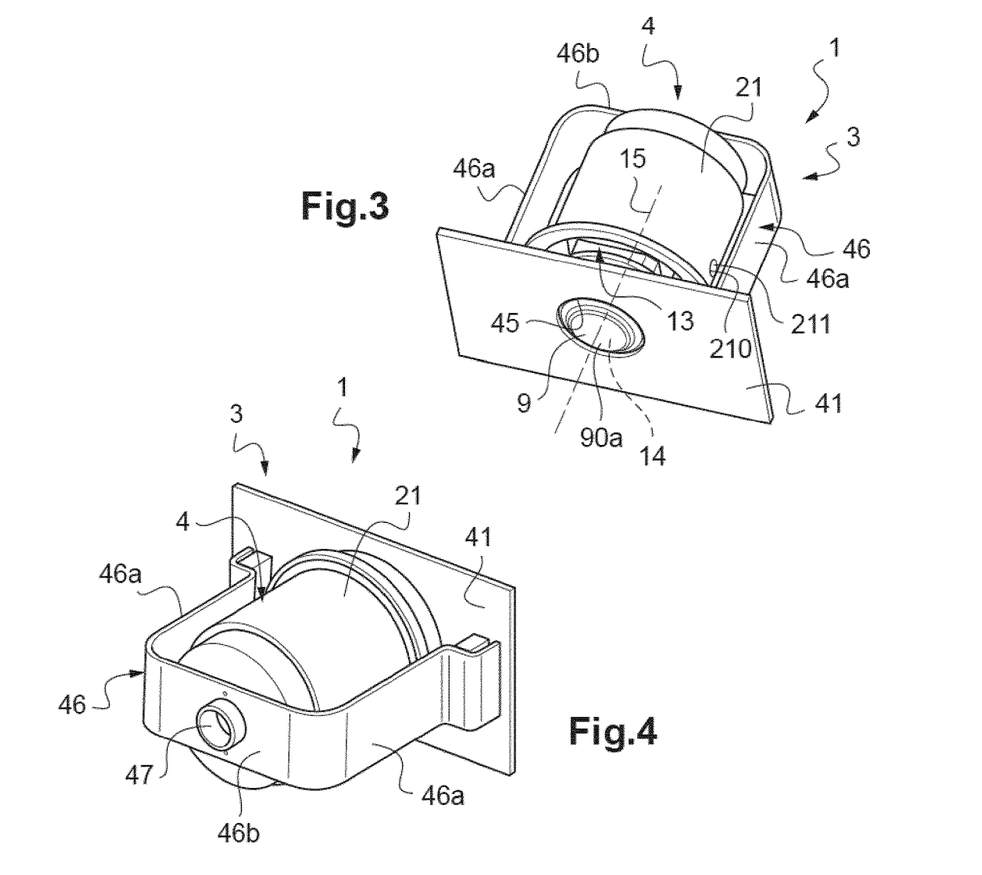

The protection device 3 furthermore includes an optical element 9, better seen on FIGS. 2a to 3, that is transparent and mounted rotably about an axis of rotation A1. This optical element 9 is configured to be disposed upstream from the optical element 14 of the optical sensor 13 such that the axis of rotation A1 of the optical element 9 coincides with the optical axis 15 of the optical sensor 13.

The optical element 9 is arranged at the front of the protection device 3. The front of the protection device 3 extends from the part intended to face the road scene, the optical sensor 13 of the device 3 participating in taking images thereof when the protection device 3 is installed on the vehicle 100 (FIG. 1).

The protection device 3 furthermore includes a motor 5, visible on FIGS. 2a and 2b, configured to rotate the optical element 9.

The motor 5 is arranged at the back of the protection device 3. The back of the protection device 3 means the part opposite the front of the protection device 3; the back of the protection device 3 is therefore the part the furthest away from the road scene, of which the optical sensor 13 participates in taking images. In other words, the motor 5 is arranged on the side opposite the optical unit 14 of the optical sensor 13 and opposite the optical element 9.

The motor 5 is mounted rotably about an axis of rotation A2. To do this, the motor 5 includes a rotary shaft 51. In particular, the motor 5 includes a fixed stator 53 and the rotary shaft or rotor 51 is rotably movable with respect to the fixed stator 53.

According to the illustrated embodiment, the rotor 51 is disposed around the stator 53. The stator 53 is therefore inner and the rotor 51 outer.

Furthermore, the motor 5 is arranged such that its axis of rotation A2 coincides with the axis of rotation A1 of the optical element 9, and with the optical axis 15 of the optical sensor 13.

As a non-limitative example, it can more particularly be a brushless motor.

The motor 5 can have a speed of rotation between 1000 and 50000 rpm, preferably between 5000 and 20000 rpm, and more preferably between 7000 and 15000 rpm. Such speeds of rotation allow the elimination of potential contaminants that would have been deposited on the optical element 9, elimination by centrifuge effect and thereby allowing the optical unit 14 of the optical sensor 13 to be kept clean so as to ensure optimized operation of the driver assistance system 1.

The motor 5 is for example electrically powered by a power supply connected to the general electric circuit of the vehicle 100 (FIG. 1).

Referring to FIGS. 2a to 4, the protection device 3 can furthermore include a casing 4 advantageously integrated with the optical element 9 and mounted rotably movable about the axis of rotation A1 of the optical element 9.

The casing 4 is preferably a sealed casing.

This casing 4 is arranged so as to be rotated by the motor 5, which allows the optical element 9 to rotate. The optical element 9 in this particular example is therefore configured to be rotated with the casing 4 so as to allow the optical element 9 to be cleaned by centrifuge effect.

The optical element 9 is configured to be disposed at the front of the casing 4. The front of the casing 4 extends from the part of the casing 4 intended to face the road scene, of which the optical sensor 13 participates in taking images, when the protection device 3 is mounted on the vehicle 100 (FIG. 1). In contrast, the back of the casing 4, better seen on FIGS. 2a, 2b, extends from the part of the casing 4 opposite the front of the casing 4; the back of the casing 4 is therefore the part furthest away from the road scene, of which the optical sensor 13 participates in taking images.

Furthermore, the casing 4 includes a housing 19 (see FIG. 2a) configured to accommodate the optical sensor 13 such that the optical axis 15 of the optical sensor 13 coincides with the axis of rotation A1 of the optical element 9 and the casing 4.

This housing 19 is also configured to accommodate the motor 5. More precisely, the motor 5 is arranged at the back of the casing 4. According to the described embodiment, the motor 5 is arranged on the side opposite the optical element 9.

The casing 4 being integral with the optical element 9, this forms a sealed block thus preventing the introduction of contamination inside the casing 4 intended to accommodate the optical sensor 13 and the motor 5.

Furthermore, the motor 5 in this example is arranged in the extension of the optical sensor 13. More precisely, the motor 5 is hollow and is configured to accommodate at least partially the optical sensor 13, and in particular to accommodate in its hollow part the back part of the optical sensor and more particularly the connection part 17 that extends protruding from the main body 13' of the optical sensor. In particular, it is the motor fixed stator 53 that is hollow and can accommodate a part of the optical sensor 13. As specified previously, this is a back part of the optical sensor 13 on the side opposite the optical unit 14.

When installing the optical sensor 13, the motor 5 and the protection device 3, the stator 53 of the motor 5 is disposed around the sheath of the linking piece 16 of the optical sensor 13. The stator is passed through until it is blocked by the presence of the collar of the linking piece. It is understood that this arrangement ensures that the motor is not disposed axially beyond the end surface 18 of the main body 13' of the optical sensor 13. Whatever the size and the shape of the main body of the optical sensor, the same motor 5 can be used as long as the connection part 17 and the sheath of the linking piece 16 have stable dimensions from one optical sensor to another. It is henceforth not necessary to oversize the motors so as to adapt to large cameras, which presents a cost advantage and reduces the phenomenon of imbalance such that, once again, it is not necessary to oversize the associated bearings.

Furthermore, the casing 4 is integral with the rotary shaft or rotor 51 of the motor 5.

Furthermore, the casing 4 includes a wall 21 defining the housing 19 for the optical sensor 13. This wall 21 is centered about the axis of rotation A1 of the optical element 9 and the casing 4. In this example, the wall 21 is substantially generally cylindrical in shape, as can be seen better on FIGS. 2b to 4.

According to a first variant, the wall 21 can be made in a single piece with the optical element 9.

According to a second variant, the wall 21 and the optical element 9 can be made in two distinct pieces, and in this case the wall 21 is integrated with one end of the optical element 9. In particular, it is the front end of the wall 21 that is integrated with the optical element 9. As previously, the front is defined as the part nearest to the road scene. As a non-limitative example, the integration between the wall 21 and the optical element 9 can be made by ultrasonic welding.

The casing 4 and the optical element 9 can thus be made in one or more pieces.

The casing 41, in particular the wall 21, can be made in any appropriate material known to a person skilled in the art, for example aluminum or heat conducting polycarbonate.

Furthermore, the wall 21 advantageously includes an opening 21a (see FIGS. 2a, 2b) surrounding the linking piece 16 at the back of the optical sensor 13 when the optical sensor 13 is arranged inside the casing 4.

As a variant or complement, at least one means of limiting condensation is advantageously provided, hereinafter called anti-condensation means. Such an anti-condensation means can be provided at the casing 4. In particular, at least one anti-condensation means can be arranged on the wall 21 of the casing 4.

As a non-limitative example, the anti-condensation means can comprise at least one through orifice 210 at the casing 4, in this example on the wall 21 (see FIGS. 2a to 3). The orifice or orifices 210 can be made by drilling. When several orifices 210 are provided, they are preferably arranged symmetrically with respect to the axis of rotation A1 of the casing 4.

According to the example illustrated on FIG. 2a, two orifices 210 are provided, arranged symmetrically with respect to the axis of rotation A1 of the casing 4. The orifices 210 communicate between the inside of the casing 4 and the outside of the casing 4 when the protection device 3 is assembled as illustrated on FIG. 2a. As a non-limitative example, each orifice 210 can have a diameter of the order of 5 mm.

Furthermore, one or more semi-permeable membranes 211 can be provided, arranged respectively at least at one orifice 210 (FIGS. 2a to 3). According to the example illustrated on FIG. 2a, two membranes 211 are schematically shown. Each membrane 211 can be fastened over an associated orifice 210 in a sealed manner, for example by bonding or by ultrasonic welding.

These membranes 211 are, according to the described embodiments, permeable to air and impermeable to water. The membrane or membranes 211 thus assist the circulation of air inside the casing 4. This allows good ventilation between the optical unit 14 and the optical element 9 and thus prevents the accumulation of condensation.

At least one means of compensating for the high weight at the orifice 210 or the orifices 210 is furthermore advantageously provided. According to the particular example illustrated on FIGS. 2a to 3, with two orifices 210 symmetrical with respect to the axis of rotation A1 of the casing 4 (better seen on FIG. 2a), the two membranes 211 are also placed symmetrically with respect to the axis of rotation A1 of the casing 4 and it is this symmetrical arrangement that allows the effects of weight to be limited with respect to the centrifugal force when the casing 4 rotates.

With more particular regard to the optical element 9, same is intended to protect the optical unit 14 of the optical sensor 13 from potential projections of contaminants or solid debris that could damage this optical unit 14. This is therefore an element of protection, or more precisely a protection mask of the optical sensor 13, and it is this optical element 9 that is exposed to the attacks from outside, that is to say, projections of water as well as contaminants, gravel, and deposits of pollutants or traces of water.

This optical element 9 can be made in glass or in a transparent plastic material such as polycarbonate.

The optical element 9 is disposed in a centered manner with respect to the axis of rotation A1. This optical element 9 has in particular a symmetry of revolution with respect to the axis of rotation A1.

When assembling the protection device 3, the optical element 9 is arranged in a centered manner with respect to the optical sensor 13, more precisely in a centered manner with respect to the optical unit 14.

As stated previously, the optical element 9, made in a single piece with the wall 21 of the casing 4 or integrated with an end of this wall 21, is arranged at the front of the protection device 3, in this example at the front of the casing 4.

According to a variant, the optical element 9 is distinct from the optical sensor 13. In this case, the optical element 9 is intended to be disposed upstream from the optical sensor 13, more precisely upstream from the optical element 14. In this text, the term upstream is defined with respect to the optical axis 15 and with respect to the road scene, of which the optical sensor 13 participates in taking images. In other words, "upstream" from the optical unit 14 means a position in which the optical element 9 is disposed between the optical unit 14 and the road scene, of which the optical sensor 13 participates in taking images, along the optical axis 15.

According to another variant, the optical element 9 can be formed by a part of the optical sensor 13 such as an outer lens of the optical unit 14 of the optical sensor 13. In this case, the optical element 9 is also disposed upstream from the optical unit 14, that is to say between the optical unit 14 and the road scene, of which the optical sensor 13 participates in taking images, along the optical axis 15.

According to either one of these variants, the optical element 9 being disposed upstream from the optical unit 14 of the optical sensor 13, its embodiment in a transparent material allows the efficiency of the optical sensor 13 not to be adversely affected.

Furthermore, according to either one of these variants, with reference to FIGS. 1 to 3, when the protection device 3 accommodating the optical sensor 13 is mounted on the vehicle 100, the optical unit 14 and the optical element 9 protrude from an opening made on the element 2 of the vehicle 100. With such an arrangement, the optical sensor 13 has a wide angle of view V delimited in a schematic way by the dashes on FIG. 2a, and the optical unit 14 stays clean due to the presence of the optical element 9 between the optical unit 14 and the outside of the vehicle 100 (FIG. 1).

In addition, according to either one of the variants of the optical element 9 distinct from or belonging to the optical sensor 13, the optical element 9 is dimensioned so as to cover the entire surface of the optical unit 14 (see FIGS. 2a to 3).

To do this, and again referring to FIGS. 2a and 2b, when the optical element 9 is distinct from the optical sensor 13, the optical element 9 can have:
- a mask-forming part 90a intended to be arranged opposite the optical unit 14 of the optical sensor 13, and
- in the extension of this mask 90a, a retaining part 90b intended to surround the front part of the optical sensor 13 having the optical unit 14, that is to say the part of the optical sensor 13 intended to face the road scene, of which the optical sensor 13 participates in taking images.

Of course, the retaining part 90b has a shape complementing the shape of the front part of the optical sensor 13 it is intended to surround. According to the illustrated example, this retaining part 90b can have a substantially stepped shape that extends the mask-forming part 90a of the optical element 9. This stepped shape of the optical element 9 is better seen on FIGS. 2a, 2b and 5. Furthermore, the retaining part 90b of the optical element 9 is the part that is fastened to the front end of the wall 21 of the casing 4 (see FIGS. 2a, 2b), when the optical element 9 is not made in a single piece with this wall 21.

Advantageously, the optical element 9 has a general shape substantially similar to the shape of the optical unit 14. In this example, the optical element 9 is at least in part substantially convex in shape, with a curve substantially parallel to the curved surface of the optical unit 14 of the optical sensor 13. This convex part of the optical element 9 has for example a diameter close to that of the optical unit 14 of the optical sensor 13. According to the illustrated example, it is the mask-forming part 90a, intended to be arranged directly opposite the optical unit 14 of the optical sensor 13 that has this substantially convex shape.

According to an alternative, not illustrated here, the optical element 9, when it is distinct from the optical sensor 13, can be at least in part substantially flat.

The optical unit 14 is thus protected from potential projections of contaminants such as organic or mineral pollutants, water or a combination of these different elements that can damage it. In addition, when the casing 4 and the optical element 9 rotate, the centrifugal force the potential contaminants are subjected to is greater than the adhesion of these contaminants on the optical element 9. The potential contaminants deposited on the outer surface of the optical element 9 are thus ejected from the optical element 9 and do not disturb the field of view V of the optical sensor 13.

Furthermore, so as to prevent a phenomenon of condensation between the optical unit 14 and the optical element 9, the inner surface 9a of the optical element 9 (see FIG. 5) advantageously has an antimist property. The inner surface 9a of the optical element 9 is the surface intended to be arranged opposite the optical unit 14 of the optical sensor 13. In particular, the inner surface 9a of the optical element 9 has an antimist coating, schematically illustrated by an arc of a circle line 23 with alternating dots and dashes.

Figure 5:
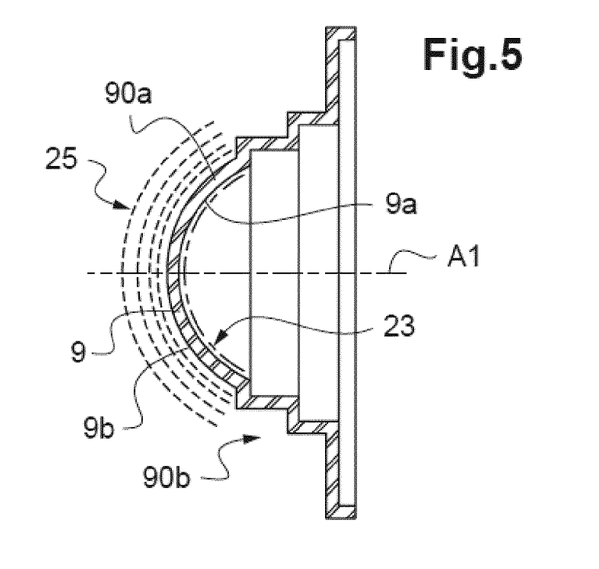

As a variant or complement, the outer surface 9b of the optical element 9 can have one or more of the following properties: hydrophobic, infrared filter, photocatalytic, super hydrophobic, lipophobic, hydrophilic, or super hydrophilic, resistant to gravel, or any other surface treatment allowing the adhesion of contaminants to be reduced.

In particular, thanks to the hydrophobic properties of the outer surface 9b of the optical element 9, potential drops of water will run over the outer surface 9b without leaving traces, because the water will be unable to adhere to this outer surface 9b.

The layers or coatings on the outer surface 9b of the element optical 9, schematically illustrated by the circular sections 25 in dashes on FIG. 5, make it possible to limit the possibilities of organic or mineral pollutants adhering, as well as the presence of traces of water on the optical element 9 that can adversely affect the correct operation of the driver assistance system 1. Advantageously, a liquid solution, such as a Rain-X® type of solution, can be deposited, for example periodically and manually, on the outer surface 9b of the optical element 9 so as to form a hydrophobic film.

These embodiment examples are provided as illustrative and non-limitative. For example, a person skilled in the art can use a transparent optical element 9 having an outer surface 9b having other properties allowing the adhesion of contaminants on this outer surface 9b to be limited without departing from the framework of this invention.

Optionally, the optical element 9 of the protection device 3 can also comprise a de-icing or demisting system such as a filament or de-icing resistor for example, integrated so as to be able to guarantee correct operability of the driver assistance system 1 whatever the meteorological conditions.

In addition, referring again to FIGS. 1 to 4, the optical element 9, and more generally the whole of the protection device 3 can be mounted on the element 2 provided on the vehicle 100 by means of a retaining and fastening means, for example comprising a fastening plate 41 and a fastening bracket 46. After assembling the protection device 3, the fastening bracket 46 can be integrated with the fastening plate 41 by any appropriate means, for example in a non-limitative way by welding, screwing or bonding. The fastening plate 41 can for example be fastened by any means to an element 2, such as a bodywork element of the vehicle 100 (FIG. 1).

Referring again to FIGS. 2a to 4, the fastening plate 41 is arranged at the front of the protection device 3. This fastening plate 41 has an opening 45 (FIGS. 2a to 3) for passing the optical element 9 and the optical unit 14 of the optical sensor 13, thereby to allow vision towards the outside. This opening 45 is provided for example so as to be arranged opposite a complementary opening of the element 2 of the vehicle 100, such that once the retaining and fastening means 41, 46 is installed on the element 2 of the vehicle 100, the optical unit 14 of the optical sensor 13 and the optical element 9 protrude from the opening 45 of the fastening plate 41 and from the opening present in the element 2 of the vehicle 100 (see FIGS. 1 to 3).

In this example, the fastening bracket 46 a has a substantially U shape or stirrup shape, with two substantially parallel and opposite branches 46a, which extend on either side of the casing 4, and connected by a base 46b. The base 46b is situated at the back of the protection device 3, here on the side opposite the fastening plate 41.

The fastening bracket 46 advantageously includes an opening 47, better seen on FIGS. 2a, 2b and 4, for passing the connection piece 16 at the back of the optical sensor 13, so as to allow the connection of the optical sensor 13 to the cables (not illustrated) necessary to the operation of the optical sensor 13. This opening 47 is provided at the back of the protection device 3, at the base 46b of the fastening bracket 46 for example substantially in the center.

Advantageously, a sealed arrangement is provided at the back of the casing 4 for passing the cables or wires so as to limit the ingress of water vapor and/or other contaminants into the casing 4. In particular, the opening 47 for passing the linking piece 16 allowing the connection of the optical sensor 13 to cables or wires is protected in a sealed manner so as to limit the ingress of water vapor and/or other contaminants into the casing 4.

Furthermore, the protection device 3 can comprise in particular one or more bearings 27, 28 schematically illustrated on FIG. 2a. The bearings 27, 28 are generally substantially annular in shape.

According to the example shown on FIG. 2a, the protection device 3 comprises two bearings 27, 28. A first bearing 27, allowing the casing 4 to rotate with respect to the fastening plate 41, is disposed outside the casing 4, between the optical element 9 and the fastening plate 41. A second bearing 28, allowing the casing 4 to rotate with respect to the fixed stator 53 of the motor, is disposed between the rotor 51 and the stator 53.

Figure 6:
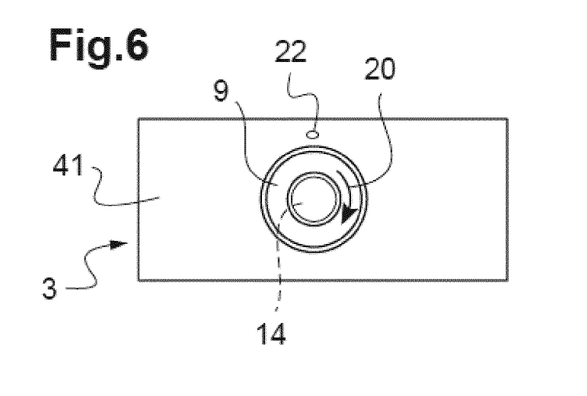
FIG. 6 is a front view of the device for protecting the optical sensor according to a variant with a nozzle for projecting cleaning fluid.

Furthermore, referring to FIG. 6, so as to improve the state of cleanliness of the optical element 9, according to an optional alternative, the protection device 3 can furthermore comprise at least one nozzle 22 for projecting a fluid, in particular for cleaning and/or drying, onto the optical element 9. This nozzle 22 can be situated above the optical element 9, for example on the fastening plate 41. According to other embodiments not illustrated here, the nozzle 22 can be situated at any position close to the optical element 9.

The fluid projected by the nozzle 22 can be compressed air or a cleaning liquid so as to ensure that the optical element 9 is cleaned if the rotation of same is not sufficient to eliminate the different contaminants that have been deposited on same. Alternatively, the projection of fluid can be used in a manner complementary to the rotation of the optical element 9 so as to ensure an optimized state of cleanliness of same. On FIG. 6, the arrow 20 illustrates the direction of rotation of the optical element 9, for example clockwise. Of course, this rotation can absolutely take place anti-clockwise according to another embodiment not illustrated here.

Furthermore, according to other embodiments not illustrated here, the protection device 3 can comprise several nozzles 22. The protection device 3 can for example comprise a first nozzle 22 configured to project a first fluid such as cleaning liquid, and a second nozzle configured to project a second fluid such as compressed air, onto the optical element 9.

The nozzle or nozzles 22 can be connected to the system for distributing the cleaning liquid of the vehicle 100 (FIG. 1). As an alternative, the protection device 3 can comprise a reservoir of cleaning liquid that is specific to same. In this case it is possible to install this driver assistance system 1 relatively easily inside any element 2 of the vehicle 100, such as a bodywork element or on any outside element of the vehicle 100, like for example the front or rear fenders or the rearview mirrors, without necessitating a long and complex initial design at vehicle 100 level in order to connect the protection device 3 to the cleaning liquid system of the vehicle 100 so as to supply the nozzle 22 (FIG. 6).

Optionally, the protection device 3 can also include elements allowing potential noise nuisances from the motor 5 to be limited so as not to inconvenience the occupants inside the vehicle 100 or the other users when using the protection device 3 due to the high speeds of rotation of the motor 5.

Furthermore, the protection device 3 as described previously with reference to all of the figures can be implemented according to a method for cleaning the optical element 9 of such a protection device 3. The cleaning method aims in particular to eliminate, by centrifuge effect, potential deposits on the optical element 9, in particular on the mask-forming part 90a of the optical element 9, when the optical element 9 is rotating. Of course, in order to be able to clean by centrifuge effect, the optical element 9 is rotated, for example by means of the casing 4, according to a non zero speed of rotation.

To do this, with reference to FIGS. 1 to 2b, the driver assistance system 1 can furthermore comprise an electronic control unit, not illustrated here, configured in particular to activate the motor 5 so as to rotate the optical element 9, for example by means of the casing 4.

According to an embodiment example of the cleaning method, the motor 5 can be activated, for example by the electronic control unit, such that the casing 4 and the optical element 9 are rotated in a permanent manner when the vehicle 100 is functioning, that is to say during driving phases or when stopped with contact.

According to another embodiment of the cleaning method, the motor 5 can be activated, for example by the electronic control unit, so as to rotate the casing 4 and the optical element 9 in an intermittent manner when the vehicle 100 is functioning. According to this embodiment, the electronic control unit can, for example, control the starting of the motor 5 when the user of the vehicle uses a functionality of the vehicle necessitating the implementation of the optical sensor 13, like for example when they select reverse gear when the driver assistance system 1 is installed, in order to allow a view to the rear of the vehicle so as to facilitate parking of same.

Advantageously, the speed of rotation of the optical element 9 can be adjusted during the cleaning method. For example, the electronic control unit is configured to control the motor 5 so as to adjust the speed of rotation according to the speed of movement of the vehicle 100. In effect, the contaminants are eliminated from the optical element 9 thanks to the centrifugal force linked with the rotation of the casing 4 and the optical element 9, and potentially combined with friction linked with the movement of the vehicle 100, in particular when the driver assistance system 1 is at the front of the vehicle 100. Thus, the higher the speed of movement of the vehicle 100, the lower the need to raise the speed of rotation of the casing 4 and the optical element 9 in order to maintain a good state of cleanliness of the optical element 9 and therefore an optimized operation of the optical sensor 13. The electronic control unit can thus be configured to act on the motor 5 so that it reduces the speed of rotation of the casing 4 when the speed of the vehicle 100 increases, in particular when the optical element 9 is installed at the front of the vehicle.

According to a particular embodiment, the electronic control unit is configured to induce a change of the direction of rotation of the optical element 9. Advantageously, the electronic control unit can change the direction of rotation of the optical element 9 several times over a predefined period of time, relatively rapid. This change of the direction of rotation assists the appearance of acceleration phenomena and makes it possible efficiently to eliminate potential small drops of water that would be located substantially at the center of the optical element 9 for example. In effect, the variation of the direction of rotation of the optical element 9 will subject the contaminants to acceleration in the reverse direction to their movement, which will assist their loss of adhesion to the optical element 9 and therefore their ejection from same.

The cleaning method can also comprise at least one step of projecting at least one fluid onto the optical element 9. This projection step can be triggered for example after detection of contaminants in the field of view V of the optical sensor 13, and/or depending on the speed of the vehicle 100 and/or according to a time delay.

For example, the electronic control unit can also be configured to trigger the projection of at least one fluid, like for example compressed air or cleaning liquid, onto the optical element 9 by means of the nozzle 22, when the optical sensor 13 detects the presence of contaminants at its field of view V for example.

According to a particular embodiment, the electronic control unit can be configured to trigger the projection of compressed air onto the optical element 9 when the vehicle 100 is stopped or when it is moving at low speed, that is to say for example at a speed lower than 15 km/h. In effect, in such a case, the aerodynamic forces can be not sufficient to be coupled in an effective manner to the centrifugal force of the rotation of the casing 4 and the optical element 9 in order to eliminate the water drops and/or contaminants that can be deposited on the optical element 9. In particular, at low speed or when the vehicle is stopped, the small drops of water situated at the center or close to the center of the optical element 9 can be difficult to eliminate as the speed of rotation of the center of the optical element 9 can be too low to eject them. Advantageously, the projection of compressed air onto the optical element 9 can make it possible to compensate for the absence of aerodynamic forces when the vehicle 100 is moving at low speed or when it is stopped.

According to another embodiment, the electronic control unit can be configured to trigger the projection of cleaning liquid and/or compressed air at the end of certain period of driving of the vehicle 100.

According to yet another embodiment, the electronic control unit can be configured to trigger the projection of cleaning fluid and/or compressed air on request from the user of the vehicle.

The cleaning method can also comprise consecutive steps of projecting different fluids. The electronic control unit can be configured, according to certain embodiments, to trigger the projection of cleaning liquid and compressed air consecutively.

According to a particular embodiment of the cleaning method, when the optical sensor 13 detects the presence of contaminants in its field of view V in spite of the centrifuge effect, the control unit can control the motor 5 to stop so as to stop the rotation of the casing 4 and the optical element 9. The electronic control unit can then control the projection of cleaning liquid through the nozzle 22 so as to detach the contamination for example. The electronic control unit can then control the projection of compressed air through the same nozzle 22 or through a second nozzle not illustrated here so as to remove the contaminants that could be incrusted on the optical element 9. The electronic control unit can then reactivate the motor 5 to rotate the casing 4 and the optical element 9 again at a speed of rotation different from the initial speed of rotation. The projection of compressed air can be performed before, simultaneously, or after restarting the rotation of the casing 4 and the optical element 9 according to this embodiment.

As a variant or complement, the cleaning method can include at least two cleaning steps, each with a different speed of rotation of the optical element 9. As a non-limitative example, it is possible to envisage:
- a first step of projecting cleaning fluid onto the optical element 9, in particular onto the mask-forming part 90a, during which the optical element 9 is rotated according to a first speed of rotation, and
- a second drying step, during which the optical element 9 is rotated at a second speed of rotation, different from the first speed of rotation.

The first speed of rotation in this example is advantageously slower than the second speed of rotation.

The start of the second drying step can be delayed.

Thus, in particular, when a fluid such as cleaning fluid is projected onto or applied to the optical element 9, the speed of rotation can be relatively low, even slowed if the optical element 9 was already rotating. This facilitates spreading the cleaning liquid. After a predefined period of time, for example relatively short so as to correspond to the time needed to spread the cleaning liquid, the speed of rotation is accelerated, making it possible to dry the outer surface 9b (see FIG. 5) of the optical element 9, in particular of the mask-forming part 90a, and also to assist the elimination of the contaminants wetted by the cleaning liquid.

Advantageously, with such an embodiment, the quantity of fluid for cleaning is much less than a conventional cleaning system of the prior art without rotation.

Furthermore, the protection device 3 can furthermore and optionally comprise a detection means (not illustrated) configured to detect the approach of an object close to the optical element 9. Advantageously, the protection device 3 comprises a proximity sensor, not illustrated here, connected to the electronic control unit. Such a proximity sensor can be for example a capacitive proximity sensor.

The driver assistance system 1 can comprise a means (not illustrated) for inhibiting the rotation of the casing 4 and the optical element 9 on detecting the approach of an object close to the optical element 9. As an example, the capacitive proximity sensor can be configured to transmit detection information of the approach of an object to the electronic control unit, and same can include one or more processing means for receiving this information and controlling the motor 5 to stop automatically so as to stop the rotation of the casing 4 and the optical element 9. This limits the risk of the optical element 9 being damaged if it is in contact with an object due to its rotation, in particular when the driver assistance system 1 is intended to be installed at the front or rear fenders of the vehicle 100.

A field of view V that is always clear and clean is thus obtained for the optical sensor 13. In fact, during operation, the motor 5 rotates the optical element 9, with respect to the optical sensor 13, for example by means of the casing 4. This rotation is possible in particular thanks to the arrangement of a part of the optical sensor 13 in the fixed stator 53 of the motor 5 and to the link between the rotary shaft 51 of the motor 5 and the optical element 9, for example by means of the casing 4. The rotation of the optical element 9 ensures the elimination of the contaminants due to the centrifugal force same are subjected to.

Furthermore, the fact that the axis of rotation A1 of the optical element 9 coincides with the optical axis 15 of the optical sensor 13 allows this system to be adapted to any type of optical sensor 13 intended to be integrated in a vehicle 100, at the same time retaining a wide angle of view.

The invention claimed is:
1. A device for protecting an optical sensor for motor vehicle, the protection device comprising:
   a transparent optical element mounted rotatably movable about an axis of rotation, said optical element being configured to be arranged upstream from the optical sensor such that the axis of rotation of said optical element coincides with the optical axis of the optical sensor; and a motor comprising a rotary shaft configured to rotate about an axis of rotation, the motor being configured to rotate said optical element such that the axis of rotation of said optical element further coincides with the axis of rotation of the rotary shaft of the motor, wherein the motor is arranged in a longitudinal extension of the optical sensor.

2. The protection device as claimed in claim 1, in which the motor is hollow and is configured to accommodate the optical sensor at least partially.

3. The protection device as claimed in claim 2, in which the motor is configured to accommodate in its hollow part a rear part of the optical sensor.

4. The protection device as claimed in claim 1, in which said optical element is arranged at the front of the protection device so as to face a road scene, of which the optical sensor is configured to participate in taking images.

5. The protection device as claimed in claim 1, in which the motor is arranged on the side opposite said optical element.

6. The protection device as claimed in claim 1, in which said optical element is disposed in a centered way with respect to its axis of rotation.

7. The protection device as claimed in claim 1, in which said optical element is distinct from the optical sensor.

8. The protection device as claimed in claim 1, including a casing having a housing configured to accommodate the optical sensor.

9. The protection device as claimed in claim 8, in which the casing is integral with the rotary shaft of the motor.

10. The protection device as claimed claim 8, in which the housing is defined by a wall of the casing.

11. The protection device as claimed in claim 1, further comprising a fastening plate and a bearing of substantially annular general shape disposed between said optical element and the fastening plate.

12. The protection device as claimed in claim 1, in which said optical element has an inner surface having an anti-mist property, wherein the inner surface of said optical element has an anti-mist coating.

13. The protection device as claimed in claim 1, in which said optical element has an outer surface having at least one property selected from the group consisting of: infrared filter, photocatalytic, hydrophobic, super hydrophobic, lipophobic, hydrophilic, super hydrophilic, and resistant to gravel.

14. A driver assistance system comprising:

an optical sensor;

a device for protecting the optical sensor as claimed in claim 1.

15. A method for cleaning an optical element of a protection device as claimed in claim 1, said method comprising:

rotating, a plurality of times, said optical element for cleaning said optical element by centrifuge effect, wherein each of the plurality of rotations is with a different speed of rotation of said optical element.

* * * * *